US011124129B2

(12) United States Patent
Chi et al.

(10) Patent No.: US 11,124,129 B2
(45) Date of Patent: Sep. 21, 2021

(54) DISPLAY MODULE

(71) Applicant: VISTEON GLOBAL TECHNOLOGIES, INC., Van Buren Township, MI (US)

(72) Inventors: Ho-Hsun Chi, Hsinchu Country (TW); Yu-Hsien Wu, New Taipei (TW); Yi-Tseng Chiang, New Taipei (TW); Tsang-Chi Li, New Taipei (TW); Chung-Yao Hsu, New Taipei (TW); Cheng-Hao Huang, Changhua Country (TW)

(73) Assignee: Visteon Global Technologies, Inc., Van Buren Township, MI (US)

( * ) Notice: Subject to any disclaimer, the term of this patent is extended or adjusted under 35 U.S.C. 154(b) by 28 days.

(21) Appl. No.: 16/511,300

(22) Filed: Jul. 15, 2019

(65) Prior Publication Data

US 2021/0016718 A1    Jan. 21, 2021

(51) Int. Cl.
*B60R 11/02* (2006.01)
*G06F 3/0488* (2013.01)
*G06F 3/045* (2006.01)

(52) U.S. Cl.
CPC ........ *B60R 11/0235* (2013.01); *G06F 3/0488* (2013.01); *B60K 2370/1438* (2019.05); *B60R 2300/20* (2013.01); *G06F 3/045* (2013.01); *G09G 2380/10* (2013.01)

(58) Field of Classification Search
CPC ............. B60R 11/0235; B60R 2300/20; G06F 3/0488; G06F 3/045; B60K 2370/1438; G09G 2380/10

USPC ......................................................... 348/837
See application file for complete search history.

(56) References Cited

U.S. PATENT DOCUMENTS

| 5,149,919 | A   | * | 9/1992  | Greanias .................. G06F 3/041 178/18.02 |
| 5,818,522 | A   |   | 10/1998 | Sato |
| 9,674,965 | B1  | * | 6/2017  | Salinger ............... H05K 5/0086 |
| 2004/0004605 | A1 | * | 1/2004  | David ................... B32B 17/064 345/173 |
| 2008/0007486 | A1 |   | 1/2008  | Fujinawa et al. |
| 2011/0141154 | A1 |   | 6/2011  | Ahn et al. |
| 2012/0307191 | A1 | * | 12/2012 | Park ..................... G02B 5/0294 349/144 |
| 2014/0267099 | A1 |   | 9/2014  | Blair et al. |
| 2015/0198834 | A1 | * | 7/2015  | Wu .................... G02F 1/133528 349/61 |
| 2016/0004137 | A1 |   | 1/2016  | Sagardoyburu |
| 2016/0170514 | A1 | * | 6/2016  | Jeon ........................ G06F 3/041 345/173 |
| 2017/0052562 | A1 | * | 2/2017  | Yamawaki ........ G02F 1/133308 |

(Continued)

FOREIGN PATENT DOCUMENTS

KR         20120008435 U     12/2012

*Primary Examiner* — Matthew K Kwan
(74) *Attorney, Agent, or Firm* — Quinn IP Law

(57) ABSTRACT

A display module for use as a front dashboard, a center console, a passenger entertainment display, or an instrument panel is described. The display module includes a display assembly that is joined to a cover lens via an optically clear adhesive layer. The display assembly is arranged as a flat planar device, and the cover lens is arranged as a curved planar surface that includes an inner laminate sheet that is joined to an outer laminate sheet via a second adhesive layer.

17 Claims, 2 Drawing Sheets

(56) References Cited

U.S. PATENT DOCUMENTS

| | | |
|---|---|---|
| 2017/0108959 A1 | 4/2017 | McMillan et al. |
| 2017/0361797 A1 | 12/2017 | Weindorf et al. |
| 2018/0031897 A1 | 2/2018 | Kikuchi et al. |
| 2019/0012032 A1 * | 1/2019 | Brandao Salgado ... G06F 3/041 |

* cited by examiner

DISPLAY MODULE

TECHNICAL FIELD

The present disclosure generally relates to on-vehicle display modules, and methods for forming display modules.

BACKGROUND

Display modules are used to present images and video to one or a plurality of viewers. Display modules can include a display panel and may also include a lens extending parallel to the display panel. Specific applications of display assemblies may include instrument clusters or infotainment systems in vehicles, for example. Such display assemblies can provide the driver and/or passengers of a vehicle with useful information for operating the vehicle and/or for entertainment.

SUMMARY

Systems and methods are disclosed herein that are related to a display module for use in-vehicle, such as in a front dashboard, a center console, a passenger entertainment display, or an instrument panel. The display module includes a display assembly that is joined to a cover lens via an optically clear adhesive layer. The display assembly is arranged as a flat planar device, and the cover lens is arranged as a curved planar device that includes an inner laminate sheet that is joined to an outer laminate sheet via a second adhesive layer.

An aspect of the disclosure includes the inner laminate sheet of the cover lens being arranged as a curved planar element, wherein the outer laminate sheet is fabricated to have a curvature that conforms to the curved planar element of the inner laminate sheet.

Another aspect of the disclosure includes a touch-sensitive element being interposed between the inner laminate sheet of the cover lens and the outer laminate sheet of the cover lens.

Another aspect of the disclosure includes the touch-sensitive element being a capacitive touch sensor.

Another aspect of the disclosure includes the touch-sensitive element being a resistive touch sensor.

Another aspect of the disclosure includes an anti-reflection (AR) film being disposed on an outer surface of the outer laminate sheet.

Another aspect of the disclosure includes an anti-glare (AG) film being disposed on an outer surface of the outer laminate sheet.

Another aspect of the disclosure includes an anti-fingerprint (AFP) film being disposed on an outer surface of the outer laminate sheet.

Another aspect of the disclosure includes an anti-smudge (AS) film being disposed on an outer surface of the outer laminate sheet.

Another aspect of the disclosure includes the outer laminate sheet of the cover lens being composed as an ultra-thin material having a thickness between 0.01 μm and 0.7 mm.

Another aspect of the disclosure includes the outer film being a thin-film liquid coating that is applied by spraying, sputtering, etc.

Another aspect of the disclosure includes the optically clear adhesive layer being a liquid optically clear adhesive layer.

Another aspect of the disclosure includes the display module being disposed as a front instrument panel in an interior portion of a vehicle.

Another aspect of the disclosure includes the second adhesive layer of the cover lens being configured as an optically-clear layer having shatter-resistant properties.

Another aspect of the disclosure includes the second adhesive layer of the cover lens being polyvinyl butyral.

Another aspect of the disclosure includes the display assembly being an electronic display unit that is incorporated into one of an instrument cluster, a center console display, and a passenger entertainment display.

Another aspect of the disclosure includes a process for fabricating a display assembly, including forming, via injection molding, an inner laminate sheet of a cover lens, cold-forming an outer laminate sheet for the cover lens, wherein the outer laminate sheet conforms to the inner laminate sheet of the cover lens. The outer laminate sheet is joined to the inner laminate sheet via a second adhesive layer. The inner laminate sheet of the cover lens is joined, via an optically clear adhesive layer, to a display assembly, wherein the display assembly is arranged as a flat planar device.

Another aspect of the disclosure includes joining, via the optically clear adhesive layer, the inner laminate sheet of the cover lens and the display assembly by applying the optically clear adhesive layer between the inner laminate sheet of the cover lens and the display assembly, and curing the optically clear adhesive layer.

Another aspect of the disclosure includes curing the optically clear adhesive layer by exposing the optically clear adhesive layer to ultraviolet light for a prescribed time period.

Another aspect of the disclosure includes curing the optically clear adhesive layer by exposing the optically clear adhesive layer to one of an elevated temperature environment, an elevated moisture environment, etc., for a prescribed time period.

The above features and advantages and other features and advantages of the present teachings are readily apparent from the following detailed description for carrying out the teachings when taken in connection with the accompanying drawings.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment. Novel aspects of this disclosure are not limited to the particular forms illustrated in the above-enumerated drawings. Rather, the disclosure includes modifications, equivalents, and combinations falling within the scope of the disclosure as encompassed by the appended claims.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as inner, outer, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
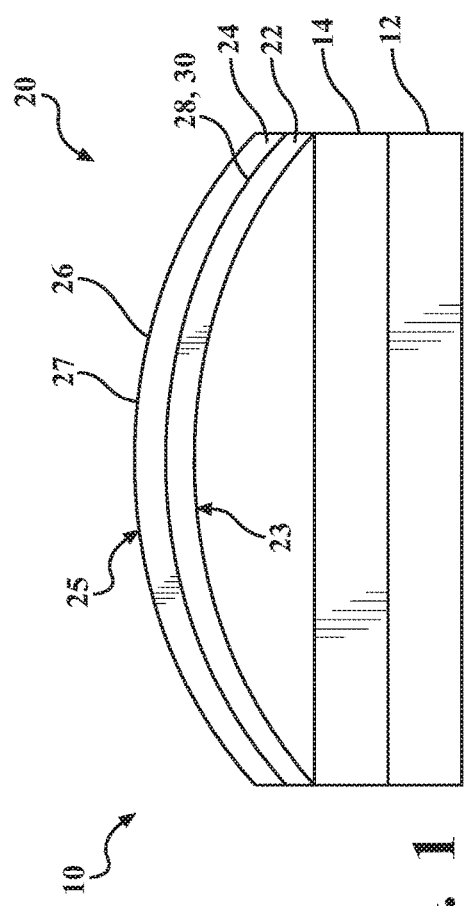
FIG. 1 is an end view of an embodiment of a display module including a display assembly and cover lens, in accordance with the disclosure.

Referring to the Figures, wherein like numerals indicate like parts throughout the several views, FIG. 1 schematically shows an end view of a display module 10, which may be disposed in a vehicle interior as a front dashboard, an instrument cluster, a center console display, a passenger entertainment display, an instrument panel, etc. The display module 10 includes a display assembly 12 that is joined to a cover lens 20 via an optically clear adhesive (OCA) layer 14. The display assembly 12 is arranged as a flat planar device, and the cover lens 20 is arranged as a curved planar device that is composed as a multi-layer laminate sheet. In one embodiment, a touch-sensitive element 30 is disposed thereon. The display module 10 described herein that includes a curved outer surface fabricated from materials having a capability of impact-absorption.

The display assembly 12 may be arranged as flat planar device employing a liquid-crystal display (LCD) that employs thin-film transistor technology in one embodiment. Alternatively, the display assembly 12 may employ an organic light-emitting diode (OLED) display, or another device.

The cover lens 20 is arranged as a curved planar device that is a multi-layer laminate sheet that includes an inner laminate sheet 22 that is fused or joined to an outer laminate sheet 24 via a second adhesive layer 28. The term "inner" as used herein indicates that the associated inner laminate sheet 22 is disposed towards the display module 10, and the term "outer" as used herein indicates that the outer laminate sheet 24 is disposed away from the display module 10. In one embodiment, the touch-sensitive element 30 is disposed between the inner laminate sheet 22 and the outer laminate sheet 24.

The inner laminate sheet 22 of the cover lens 20 is arranged as a curved planar element having a first curved planar surface 23. The inner laminate sheet 22 is fabricated from glass, plastic, or another moldable transparent material, and may be formed via an injection molding process or another molding process.

The outer laminate sheet 24 is an ultra-thin material that is fabricated to have a second curved planar surface 25 that conforms to the first curved planar surface 23 of the inner laminate sheet 22. The outer laminate sheet 24 may be fabricated to conform to the first curved planar surface 23 of the inner laminate sheet 22 employing a cold-forming process, wherein the second adhesive layer 28 is interposed to join the outer laminate sheet 24 to the inner laminate sheet 22 during the cold-forming process. The second adhesive layer 28 is an optically-transparent adhesive material having high elongation properties, high tensile strength, high tear resistance, and other properties related to shatter resistance. In one embodiment, the second adhesive layer 28 is polyvinyl butyral (PVB), which is a resinous material that provides strong binding, optical clarity, surface adhesion, toughness and flexibility. The outer laminate sheet 24 is composed as an ultra-thin material having a thickness between 0.01 μm and 0.7 mm in one embodiment.

The outer laminate sheet 24 includes an outer surface 26 that is exposed in the passenger compartment of the vehicle. The outer surface 26 may include one or more films 27 disposed thereon to enhance clarity and readability of the underlying display assembly 12. The films 27 disposed on the outer surface 26 may include an anti-reflection (AR) film, an anti-glare (AG) film, an anti-smudge (AS) film, and/or an anti-fingerprint (AFP) film. The aforementioned films 27 may be applied as laminate sheets, or, alternatively, as thin-film liquid coatings that may be applied by spraying, sputtering, etc. The outer surface 26 of the outer laminate sheet 24, including any of the films 27, provide a glass-like feeling when touched. Furthermore, the AG functionality may be achieved by etching on either or both the outer surface 26 and the second curved planar surface 25 of the outer laminate sheet 24.

The touch-sensitive element 30 is interposed between the inner laminate sheet 22 of the cover lens 20 and the outer laminate sheet 24 of the cover lens 20. In one embodiment, the touch-sensitive element 30 is a capacitive touch sensor. In one embodiment, the touch-sensitive element 30 is a resistive touch sensor.

The OCA layer 14 may be fabricated from an optically clear adhesive material, a liquid optically clear adhesive material, or another material.

The process of fabricating the display module 10 includes forming, via injection molding, the inner laminate sheet 22 of the cover lens 20, and cold-forming the outer laminate sheet 24 for the cover lens 20 by conforming the outer laminate sheet 24 to the inner laminate sheet 22 at a temperature less than 100° C. The use of ultra-thin material to form the outer laminate sheet 24 facilitates employment of cold-forming processes. One benefit of cold-forming the outer laminate sheet 24 is to reduce manufacturing cycle times, as compared to other forming processes. The outer laminate sheet 24 is joined to the inner laminate sheet 22 employing the second adhesive layer 28. The cover lens 20 is joined to the display assembly 12 by applying the OCA layer 14 to the inner laminate sheet 22 and assembling the inner laminate sheet 22 to the display assembly 12 and curing the optically clear adhesive layer 14. In one embodiment, curing the optically clear adhesive layer 14 includes exposing the optically clear adhesive layer 14 to ultraviolet light for a prescribed time period. Alternatively, or in addition, the optically clear adhesive layer 14 may be cured employing thermal-based curing, moisture-based curing, or another curing method. Curing the optically clear adhesive layer 14 may include, by way of non-limiting example, exposing the optically clear adhesive layer 14 to one or more of of an ultraviolet light, an elevated temperature environment, and/or an elevated moisture environment for a prescribed time period.

Figure 2:
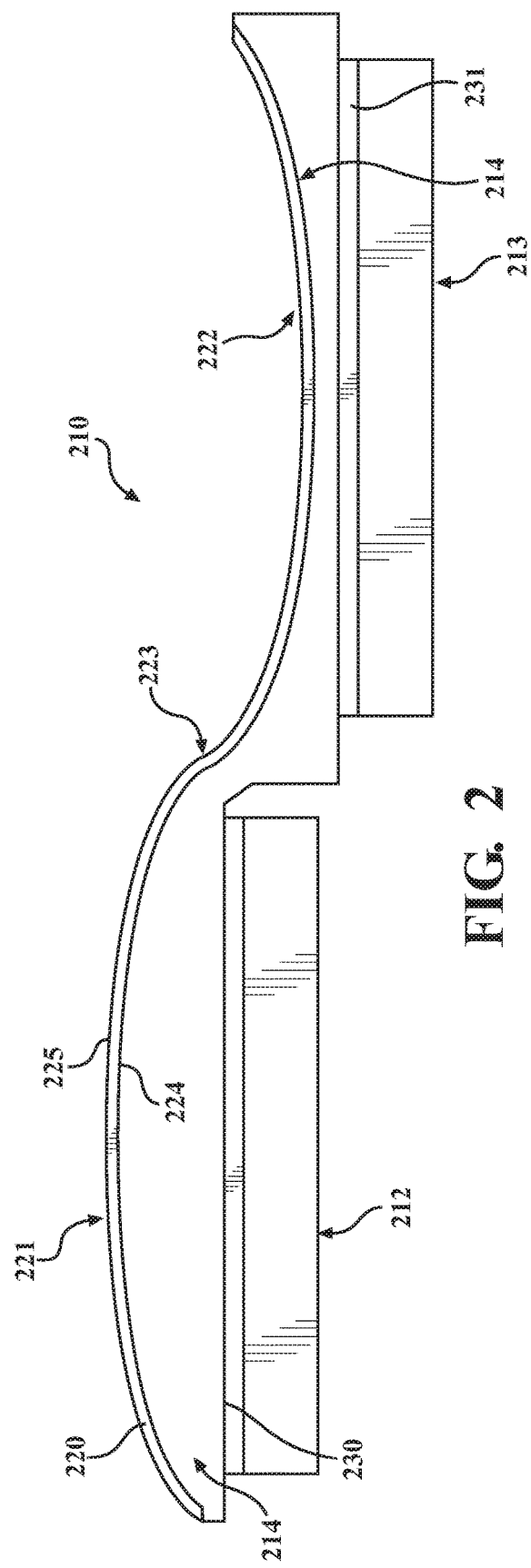
FIG. 2 is a top view of an embodiment of a display module including a display assembly and cover lens, in accordance with the disclosure.

FIG. 2 provides a top view of another embodiment of the display module 210. This embodiment includes first and second display assemblies 212, 213, respectively, and a cover lens 220. The first and second display assemblies 212, 213 are arranged as flat planar devices, are arranged in parallel, and arranged offset in both a lateral direction (horizontal as shown) and a longitudinal direction (vertical as shown). The cover lens 220 is analogous to the cover lens 20 that is described with reference to FIG. 1, and is arranged as a curved planar device, wherein the curved planar shape is a complex planar shape having a first, convex portion 221 and a second, concave portion 222 that are joined at an inflection point 223. An OCA layer 214 is interposed between and joins the first and second display assemblies 212, 213 to the cover lens 220. The inner laminate sheet 224 may be fabricated from glass, plastic, or another moldable transparent material, and may be formed via an injection molding process or another molding process, and defines the complex planar shape including the first, convex portion 221 and the second, concave portion 222. The outer laminate sheet 225 is an ultra-thin material that conforms to the complex planar shape of the inner laminate sheet 224. First and second touch-sensitive elements 230, 231 may be disposed on respective first and second display assemblies 212, 213.

Figure 3:
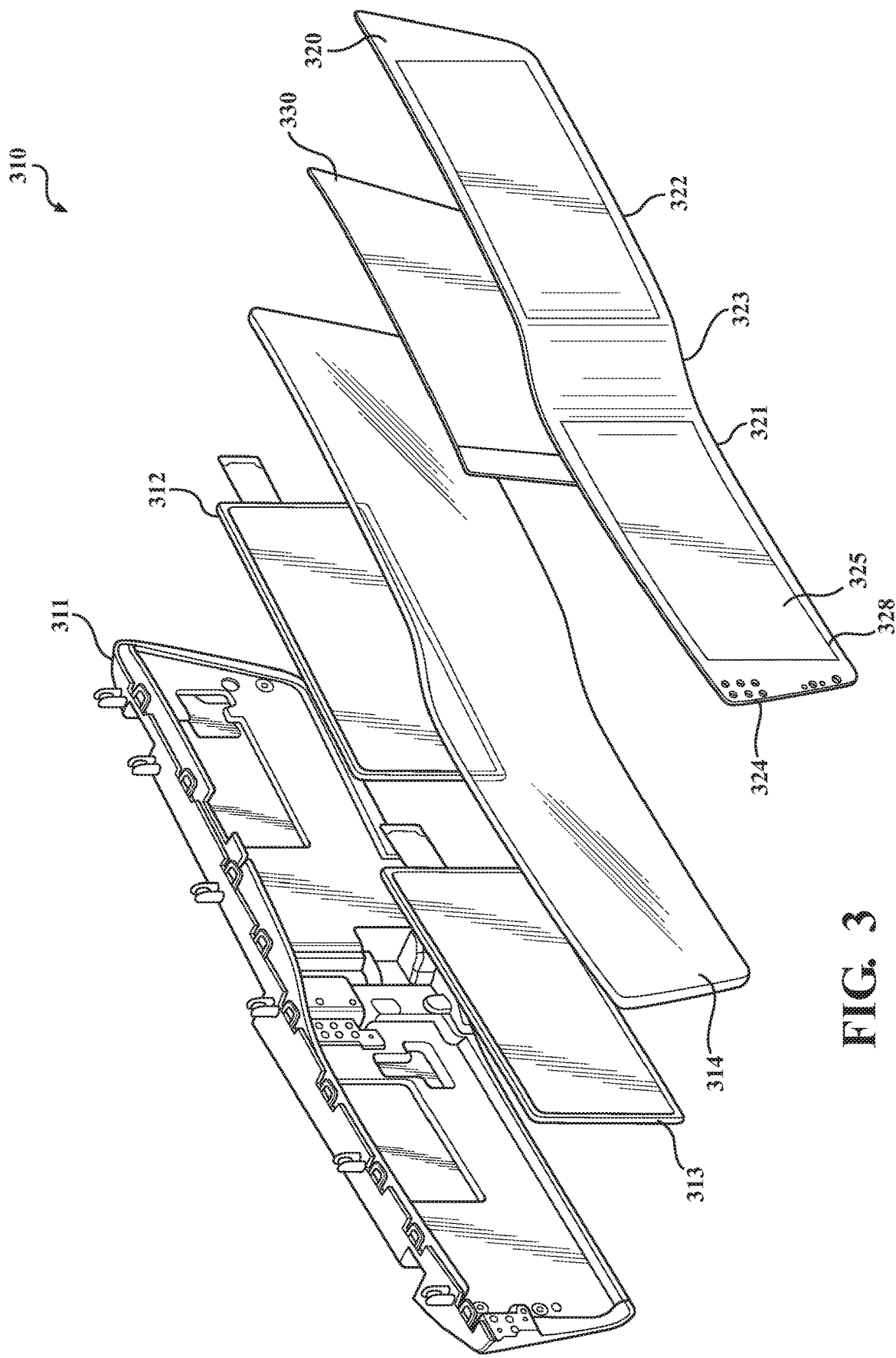
FIG. 3 is an exploded isometric view of an embodiment of a display module including a display assembly and cover lens, in accordance with the disclosure.

FIG. 3 is an exploded isometric view of another embodiment of the display module 310, and includes first and second display assemblies 312, 313, respectively, mounted on a frame 311, and a cover lens 320. The first and second display assemblies 312, 313 are arranged as flat planar devices, are arranged in parallel, and arranged offset in both a lateral direction (horizontal as shown) and a longitudinal direction (vertical as shown). The cover lens 320 is analogous to the cover lens 20 that is described with reference to FIG. 1, and is arranged as a curved planar device, wherein the curved planar shape is a complex planar shape having a first portion 321 and a second portion 322 that are joined at an inflection point 323. The cover lens 320 is arranged as a multi-layer laminate sheet that includes an inner laminate sheet 324 that is fused or joined to an outer laminate sheet 325.

The display assemblies 312, 313 are joined to the cover lens 320 via an OCA layer 314. Mechanical stiffness of the cover lens 320 is provided by the complex planar shape and by an external frame portion 328 that is disposed on the outer periphery of the cover lens 320. The inner laminate sheet 324 may be fabricated from glass, plastic, or another moldable transparent material, and may be formed via an injection molding molding process or another molding process, and defines the complex planar shape including the first, convex portion 321 and the second, concave portion 322. The outer laminate sheet 325 is an ultra-thin material that conforms to the complex planar shape of the inner laminate sheet 324. A first touch-sensitive element 330 may be disposed on the first display assembly 312. In one embodiment, the first touch-sensitive element 330 includes cluster-touch capability. The second display assembly 313 does not have a touch capability in one embodiment. Alternatively, the second display assembly 313 includes touch capability.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the appended claims.

The invention claimed is:

1. A display module, comprising:
a first display assembly, a second display assembly, and a cover lens;
wherein the first and second display assemblies are flat planar devices;
wherein the first and second display assemblies are arranged offset in a lateral direction and a longitudinal direction;
wherein the first and second display assemblies are joined to the cover lens via an optically clear adhesive layer;
wherein the cover lens includes an inner laminate sheet joined to an outer laminate sheet via a second adhesive layer;
wherein the cover lens has a complex planar shape including a convex portion and a concave portion that are joined at an inflection point;
wherein the convex portion of the cover lens is joined to the first display assembly; and
wherein the concave portion of the cover lens is joined to the second display assembly.

2. The display module of claim 1, comprising the inner laminate sheet of the cover lens being arranged with the complex planar shape including the convex portion and the concave portion that are joined at the inflection point, wherein the outer laminate sheet is cold-formed to have a curvature that conforms to the complex planar shape including the convex portion and the concave portion joined at the inflection point of the inner laminate sheet.

3. The display module of claim 1, further comprising a touch-sensitive element interposed between the inner laminate sheet of the cover lens and the outer laminate sheet of the cover lens.

4. The display module of claim 3, wherein the touch-sensitive element comprises a capacitive touch sensor.

5. The display module of claim 3, wherein the touch-sensitive element comprises a resistive touch sensor.

6. The display module of claim 1, further comprising an anti-reflection (AR) film disposed on an outer surface of the outer laminate sheet.

7. The display module of claim 1, further comprising an anti-glare (AG) film disposed on an outer surface of the outer laminate sheet.

8. The display module of claim 1, further comprising an anti-fingerprint (AFP) film disposed on an outer surface of the outer laminate sheet.

9. The display module of claim 1, further comprising an anti-smudge (AS) film disposed on an outer surface of the outer laminate sheet.

10. The display module of claim 1, further comprising a thin coating disposed on an outer surface of the outer laminate sheet, wherein the thin coating includes at least one of an anti-reflection (AR) film, an anti-glare (AG) film, an anti-fingerprint (AFP) film, and an anti- smudge (AS) film.

11. The display module of claim 1, wherein the outer laminate sheet of the cover lens is composed as an ultra-thin material having a thickness between 0.01 µm and 0.7 mm.

12. The display module of claim 1, wherein the optically clear adhesive layer comprises a liquid optically clear adhesive layer.

13. The display module of claim 1, wherein the optically clear adhesive layer comprises an optically clear laminate sheet.

14. The display module of claim 1, wherein the display module is disposed as a front instrument panel in an interior portion of a vehicle.

15. The display module of claim 1, wherein the second adhesive layer of the cover lens is configured as an optically-clear layer having shatter-resistant properties.

16. The display module of claim 1, wherein the second adhesive layer of the cover lens comprises polyvinyl butyral.

17. The display module of claim 1, wherein the display assembly comprises an electronic display unit that is incorporated into one of an instrument cluster, a center console display, and a passenger entertainment display.

* * * * *